Jan. 6, 1942.   W. T. BIRDSALL   2,269,173
METHOD AND MEANS FOR STORING REFRIGERANTS
Filed Nov. 4, 1937   2 Sheets-Sheet 1
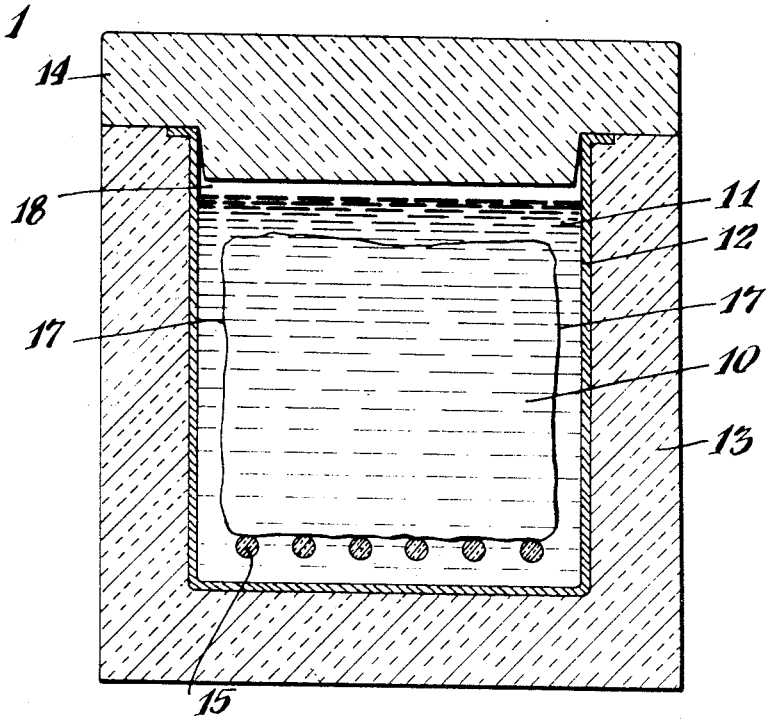
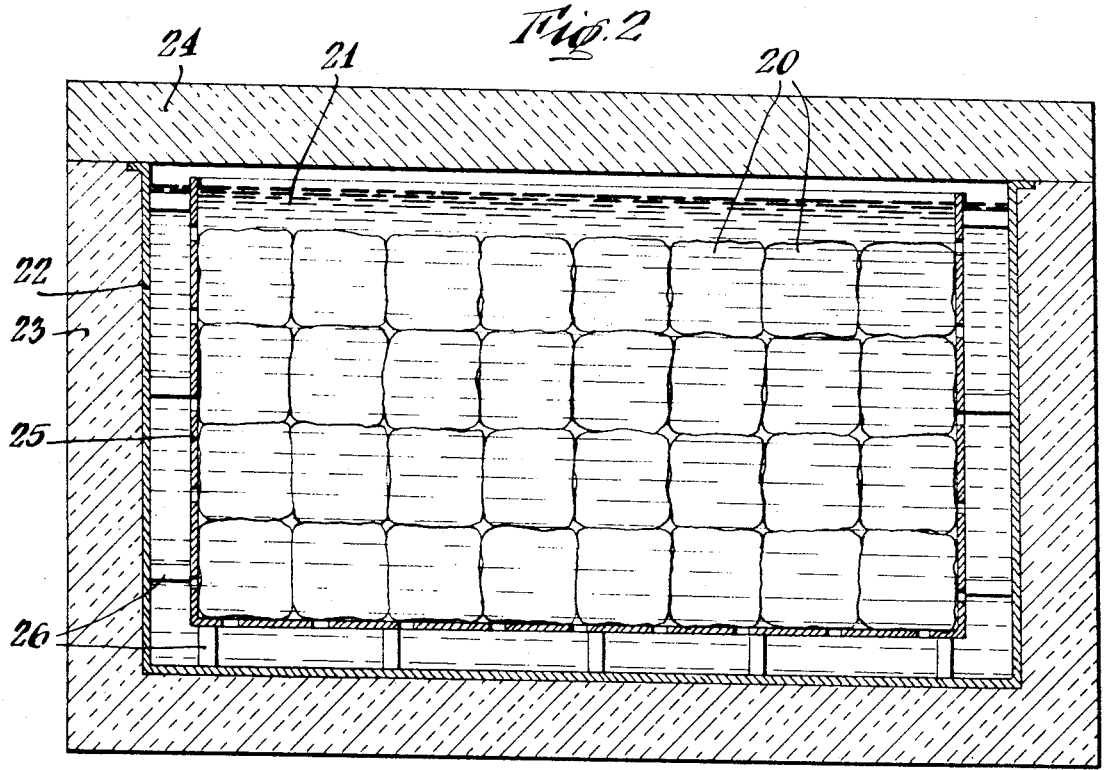
INVENTOR
Winfred T. Birdsall, Deceased
By Alvin C. Birdsall, Administrator
By Hoguet, Meary & Campbell
ATTORNEYS

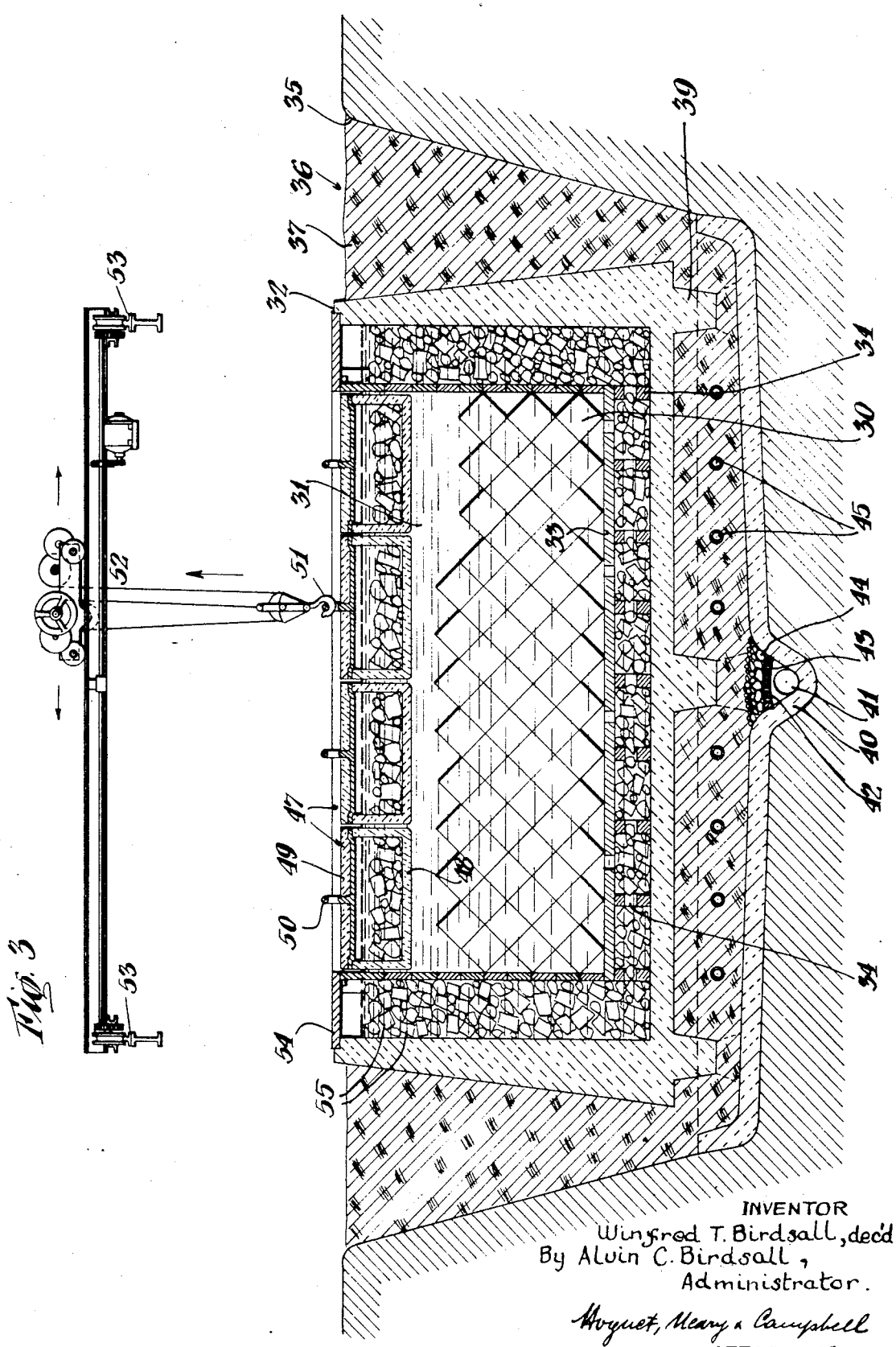

Patented Jan. 6, 1942

2,269,173

UNITED STATES PATENT OFFICE 2,269,173

METHOD AND MEANS FOR STORING REFRIGERANTS

Wilfred T. Birdsall, deceased, late of Montclair, N. J., by Alvin C. Birdsall, administrator, Washington, D. C., assignor to Mergenthaler Linotype Company, Brooklyn, N. Y., a corporation of New York Application November 4, 1937, Serial No. 172,716

8 Claims. (Cl. 62—91.5)

This invention relates to methods and means for storing or preserving materials and especially to methods and means for preserving refrigerants such as solid carbon dioxide and the like, over extended periods of time.

The use of solid carbon dioxide as a refrigerant has come into considerable favor during recent years due particularly to its extremely low temperature and to the fact that it passes directly from a solid to a gaseous state without leaving any liquid. Ordinarily the material is manufactured in the form of blocks which are stored in a container with heat insulated walls. Paper is frequently wrapped about the material to diminish convection currents which bring heat to the material and remove carbon dioxide vapor being evaporated therefrom. These methods of preservation, however, are unsatisfactory since the blocks not only decrease rapidly in weight due to substantially unrestricted evaporation thereof, but also due to a process of disintegration which takes place throughout the material producing a weak and sometimes granular structure. It has been suggested that the material be preserved under pressure and at temperatures above that which dry ice assumes when subjected to atmospheric pressure but this system is only adapted for use in preserving small quantities of material. Moreover, preservation of the material at relatively high temperatures sacrifices much of the value of the material as a refrigerant.

In accordance with the present invention, these disadvantages and objections to present methods of storage are overcome, loss in weight of the material is minimized, and disintegration largely inhibited. Furthermore, the present invention renders it possible to preserve blocks of the material under substantially atmospheric pressure and at low temperature. To this end, the material preferably is immersed in a medium which may be liquid, semi-liquid, or plastic under the conditions of storage. The medium should be a good heat insulator and it is also desirable that it have a high specific heat so as to be substantially unaffected by fluctuations in external temperature. However, the medium selected for use in any particular installation should be chosen to provide a balance between the heat conductivity, specific heat, and other physical properties thereof such as to give the best results under the conditions of use. The medium used may be of any suitable character and may advantageously be a liquid such as that referred to in applicant's copending application Serial No. 172,718 filed Nov. 4, 1937, entitled, "Heat insulation material."

For a clearer understanding of the invention, reference is made hereafter to the accompanying figures of the drawings illustrating typical embodiments of the invention.

In the drawings:

Figure 1 is an elevation in section showing one embodiment of my invention as applied to the preservation of a single block of solid carbon dioxide;

Figure 2 is an elevation in section but on a smaller scale showing a typical form of the invention as applied to the preservation of a number of blocks of solid carbon dioxide; and Figure 3 is an elevation in section, but on a smaller scale showing a modified form of the invention as applied to the preservation of a large number of blocks of solid carbon dioxide.

In that form of the invention chosen for illustration in Figure 1, a block of solid carbon dioxide 10 is immersed in a suitable medium 11 in a container 12. The medium may be liquid, semi-liquid, or plastic as desired and may have any suitable or preferred composition such as that set forth more fully in the copending application mentioned above. However, for convenience of description, the medium is hereafter referred to throughout as a liquid.

The bottom and side walls of the container 12 may be provided with an outer layer of heat insulating material 13 such as cork board or balsa wood, and the top may be closed by a removable heat insulating cover 14. The block 10 preferably is supported in the liquid 11 in spaced relation to the walls and bottom of the container by means of a non-heat conducting grill 15, carried by the walls of the container 12 or by any other suitable means.

When the conditions of storage remain constant and the liquid is at the same temperature as the solid carbon dioxide immersed therein substantial thermodynamic equilibrium is maintained in the material as explained more fully in the copending application Serial No. 172,720 filed Nov. 4, 1937, entitled: Methods and means for controlling dry ice storage. Under these conditions practically no evolution of gas or evaporation of the solid carbon dioxide takes place. However, in starting a storage operation the temperature of the liquid 11 may be higher than that of the solid carbon dioxide. Under such conditions heat is transferred from the liquid 11 to the block 10 with a consequent evolution of gas and cooling of the liquid. The gas thus evolved passes upwardly through the liquid to the surface thereof where it is allowed to escape into the space 18 in the upper portion of the container 12. As the temperature of the liquid is reduced its viscosity is increased and the tendency for the liquid to form convection currents is correspondingly decreased. The temperature of solid carbon dioxide preserved under atmospheric pressure is very low, namely, about −110° F., and at this temperature nearly all liquids are highly viscous. The block 10 therefore becomes enveloped in or coated with a viscous liquid and, as a result, the transfer of heat from the liquid 11 and from external sources to the block 10 becomes less and less until heat is conveyed to the block only by conduction through the liquid. The amount of heat thus transferred to the block 10 is therefore diminished until little or no further evolution of gas takes place.

That portion 17 of the liquid directly adjacent the solid carbon dioxide does not contact directly with the material throughout the entire surface thereof due to the existence of a layer of vapor formed by evaporation of a relatively very small amount of the solid. In this way an envelope of liquid is formed about the block 10 which preserves an atmosphere of carbon dioxide vapor in contact with the solid carbon dioxide. The escape of gas evaporating from the solid is resisted by the envelope 17 of highly viscous liquid until the pressure developed by evaporation of the solid is sufficient to overcome the viscosity of the liquid and any external or hydro-static pressure that may be exerted upon the liquid about the block. The material of envelope 17 and the surrounding liquid 11 then yield and the gas passes upwardly through the liquid to the surface where it escapes into the space 18 in the upper portion of the container. The passageways through which the gas bubbles escape are self-healing by virtue of the fluid character of the liquid so that they close after passage of the liquid therethrough and prevent the entry of air or other gas into contact with the block 10. Yielding envelopes for the material and its vapor such as that above described and alternative forms of envelopes that may be used in the preservation of solid carbon dioxide are more fully described in copending application Serial No. 172,714 filed November 4, 1937. However, when, as in the present invention, solid carbon dioxide is to be preserved under substantially atmospheric pressure, a yielding envelope capable of permitting gas to escape but preventing admission of gas through the walls thereof is preferred.

As brought out in the latter application, the envelope 17 and the surrounding liquid 11 not only resist the diffusion of gas from the solid carbon dioxide but they are also excellent heat insulators and largely prevent the transfer of heat to the material from external sources. The atmosphere of carbon dioxide gas maintained in contact with the dry ice by the envelop is also an excellent heat insulator and as a result the surrounding medium serves to reduce to a minimum any transfer of heat to the material.

Furthermore, when the specific heat of the medium 11 is high, as is the case with most liquids, the heat absorbing capacity of the medium is large and, consequently, fluctuations in the temperature of the ambient atmosphere do not produce material change in temperature of the medium surrounding the block of solid carbon dioxide.

Moreover, when employing a medium 11 which is liquid or plastic, the envelope 17 produced thereby is of a yielding character and conforms to the shape and size of the block 10. Reduction in size or change in shape of the material by evaporation or removal of a portion of the material from storage therefore does not result in the formation of an unoccupied space within the envelope wherein convection currents can be produced.

From the foregoing description of the invention as embodied in the construction of Figure 1, it will be apparent that solid carbon dioxide can be preserved at low temperature and under substantially atmospheric pressure for long periods of time with the elimination of convection currents in the vapor or medium about the material and without material loss of deterioriation thereof.

The construction of Figure 1 is described as applied to the preservation of a single block of solid carbon dioxide but it will be evident that the same principle may be applied to the preservation of any number of blocks or any amount of material.

In that form of the invention illustrated in Figure 2, any number of blocks 20 of solid carbon dioxide are immersed in a medium such as the liquid 21 which is confined in a container 22. The bottom and side walls of the container are protected by a layer of heat insulating material 23 such as cork board or balsa wood, and the top is closed by a removable heat insulated cover 24. The blocks 20 in this instance are supported in the liquid by a non-heat conducting grill 25 which is maintained in space relation with respect to the walls of the container by a plurality of spaced rods or bars 26.

The blocks 20 may be stacked closely together or spaced apart as desired, but in either case the liquid tends to penetrate throughout the mass so that adjacent surfaces of the blocks when not in direct contact are separated by a layer of liquid. The liquid which is displaced by the blocks 20 in filling the container rises so that although there may be only a relatively small amount of liquid present, it envelopes the entire group of blocks and fills the crevices or spaces between the same. If the preservation of the material is imperfect and much of the solid evaporates off it may be necessary to supply additional liquid to the containers to cover the solid remaining but this will not ordinarily occur unless the loss of material has become substantial.

The action of the liquid in the construction illustrated in Figure 2 is similar to that described in connection with Figure 1. Effective insulation is provided by the liquid and an envelope is formed about each block and about the entire group of blocks. In this way the transfer of heat to the blocks of material is reduced to a minimum and an atmosphere of carbon dioxide vapor is maintained in contact with the material so that evaporation thereof is prevented or takes place only very slowly. Any heat which does penetrate the outside insulation 23 and the liquid medium and gas filled envelope about the blocks of material is absorbed by those blocks in the outer layers adjacent the walls of the container while those blocks in the central portion thereof are preserved without loss in weight and without deterioration. This is of importance due to the fact that the blocks are usually cut up into symmetrical pieces for distribution and use. When all of the blocks are eroded by evaporation and convection currents, as is now usual after storage or transportation thereof, the amount of irregular or scrap material resulting represents a material loss. In contrast with this situation applicant's method of storage confines any loss due to evaporation to a few blocks in the outer layers of the mass being stored while the inner layers are preserved without appreciable change in shape so that they may be cut up into smaller pieces without producing appreciable loss. The saving in material is therefore of considerable value even when the actual weight of material removed from storage is no greater.

In Figure 3 of the drawings, a further embodiment of the invention is shown wherein a number of blocks of solid carbon dioxide are immersed in a medium such as the liquid 31 confined in a container 32. The blocks in this instance are shown as arranged with the sides thereof inclined to facilitate the escape of any bubbles of gas that may evaporate from the material and to permit drainage of liquid from the material when removed from storage. Any number of blocks may be stored and, of course, it is not essential that they be arranged as shown.

Preferably the blocks are supported in the liquid by a non-heat conducting grill 33 which is spaced from the walls of the container by a plurality of spacer rods or bars 34. Preferably also, the walls of the container are heat insulated by positioning the container in a pit 35 which may be dug in the ground or otherwise constructed so as to leave a surrounding space 36 into which heat insulating material 37 such as the ground cork or the like is placed. The container 32 may be supported above the floor 38 of the pit on transverse beams 39 or in any other suitable manner. If desired, a drain apron may be provided by forming a central depressed portion 40 in the floor of the pit with a drain pipe 41 to discharge any water that may condense in the insulating material 37 and collect on the apron. The drain may also have an arch 42 through which seep holes 43 extend and over which there is a strainer 44. Heating coils 45 may be positioned in the insulation between the bottom or side walls of the container 32 and the walls of the pit to dispel moisture that may collect in the insulation and become frozen while the blocks 30 are stored so as to regenerate the insulation material.

The top of the container 32 may be closed by a plurality of floats 47 which are partially submerged in the liquid 31 above the blocks 30. Each of the floats comprises a portion 48 having a removable cover 49 which is provided with a ring 50 adapted to be engaged by the hook 51 of a traveling crane 52 mounted on rails 53 above the pit. In this way the floats may be removed from the container to add or remove blocks of material therefrom and the covers 49 may be removed from the floats as desired.

In order to absorb heat which may pass through the insulation due to lack of adequate insulation or imperfections therein, means may be introduced in the space between the grill 33 and the walls 32 of the container to take up and remove such heat. The blocks 30 being stored are therefore maintained at the desired temperature and protected against the inflow of heat from external sources. Thus evaporation due to heat transfer to the blocks 30 is substantially eliminated. As illustrated, the means employed is shown as scrap solid carbon dioxide immersed in the liquid within the container. The scrap material may also be introduced into the floats 47 to insure the maintenance of the heat absorbing barrier about the blocks 30. As indicated in applicant's copending application Serial No. 172,720 referred to above, the heat absorbing barrier may be maintained at a temperature above, equal to, or below that of the blocks of ice being stored and, if desired, provision may be made for varying or controlling the temperature of the heat absorbing means employed.

As illustrated, a common medium is employed in contact with the blocks 30 and the scrap solid carbon dioxide in the heat absorbing barrier. However, it will be apparent that the grill 33 need not be made porous and separate and different liquids may be used in contact with the blocks 30 and in the space between the grill 33 and the walls of the container 32. It is also evident that material other than scrap solid carbon dioxide may be used as the heat absorbing medium and material of this character may be used in conjunction with coils 55 carrying a suitable refrigerant or cooling means functioning by itself or in conjunction with the solid material to absorb any heat which may penetrate the insulation material employed.

Periodic additions of pieces of scrap solid carbon dioxide to the barrier extending about the sides of the group of blocks 30 may be made through removal floor boards 54 which cover the space between the side walls of the container 32 and the side walls of the grill 33; while periodic additions to the pieces of scrap solid carbon dioxide in the floats 47 may be made through the removable covers 49.

While certain typical embodiments of the invention have been herein shown and described as applied to the preservation of solid carbon dioxide and similar materials under atmospheric pressure, it will be apparent that these constructions have been chosen for illustrative purposes only in order to indicate methods and means of attaining the result desired. However, many and varied changes may be made in the form and construction of the devices employed and the manner of using the same and it should therefore be understood that the invention is not limited to these particular constructions or arrangements and methods of procedure except as defined by the claims.

What is claimed is:

1. A chamber for use in the storage of solid carbon dioxide, comprising a container having a liquid therein for enclosing solid carbon dioxide placed in said container and which becomes viscous when cooled to the temperature of solid carbon dioxide at atmospheric pressure, a heat insulating casing surrounding said chamber and spaced therefrom, and additional solid carbon dioxide located in the space between said chamber and casing.

2. Apparatus for use in the storage of solid carbon dioxide, comprising a heat insulated casing located in a depression in the earth and having a storage chamber positioned therein and spaced therefrom, said storage chamber containing a liquid within which solid carbon dioxide placed in said container is immersed and heat absorbing means located between said casing and chamber.

3. Apparatus for use in the storage of solid carbon dioxide, comprising a heat insulated casing located in a depression in the earth and having a storage chamber positioned therein and spaced therefrom, said storage chamber containing a liquid within which solid carbon dioxide placed in said container is immersed and additional solid carbon dioxide located between said casing and chamber.

4. Apparatus for use in the storage of solid carbon dioxide, comprising a heat insulated casing located in a depression in the earth and having a storage chamber positioned therein and spaced therefrom, said storage chamber containing a diffusion resisting medium which encloses and tends to assume the shape of solid carbon dioxide placed in said chamber, removable cover members for said chamber containing additional solid carbon dioxide, and further additional solid carbon dioxide located in the space between said casing and chamber.

5. A method for use in preserving solid carbon dioxide, which comprises the steps of immersing solidcarbon dioxide in a liquid which becomes viscous when cooled to the temperature solid carbon dioxide assumes at atmospheric pressure, and absorbing heat flowing toward said liquid from external sources by vaporization of a refrigerant other than the solid carbon dioxide in said liquid.

6. A method for use in preserving solid carbon dioxide, which comprises the steps of immersing solidcarbon dioxide in a liquid which becomes viscous when cooled to the temperature solid carbon dioxide assumes at atmospheric pressure, and absorbing heat flowing toward said liquid by vaporization of additional solid carbon dioxide.

7. A method for use in preserving solid carbon dioxide, which comprises the steps of placing solid carbon dioxide in a container having a liquid therein which is relatively viscous throughout at temperatures in the neighborhood of $-110°$ F. so as to be enclosed by said liquid, maintaining said liquid under substantially atmospheric pressure, and placing additional solid carbon dioxide about said container.

8. A method for use in preserving solid carbon dioxide, which comprises the steps of placing solid carbon dioxide in a container having a liquid therein which is relatively viscous at temperatures in the neighborhood of $-110°$ F. so as to be enclosed by said liquid, maintaining said liquid under substantially atmospheric pressure, placing additional solid carbon dioxide about said container, and immersing said additional carbon dioxide in a liquid similar to that in said container.

ALVIN C. BIRDSALL,
*Administrator of the Estate of Wilfred T. Birdsall, Deceased.*